United States Patent [19]

do Espirito Santo

[11] Patent Number: 5,044,596
[45] Date of Patent: Sep. 3, 1991

[54] SUPPORT FOR AN EXTERNAL REARVIEW MIRROR FOR MOTOR VEHICLES

[75] Inventor: Antonio F. do Espirito Santo, Sao Paulo, Brazil

[73] Assignee: Metagal Industria e Comercio Ltda., Sao Paulo, Brazil

[21] Appl. No.: 550,145

[22] Filed: Jul. 6, 1990

[30] Foreign Application Priority Data

Dec. 11, 1989 [BR] Brazil .............................. 6902580[U]

[51] Int. Cl.$^5$ ............................................. B60R 1/00
[52] U.S. Cl. .................................... 248/479; 248/900
[58] Field of Search ............... 248/479, 478, 477, 483, 248/486, 549, 900; 350/634, 631, 632, 633

[56] References Cited

U.S. PATENT DOCUMENTS

| | | | |
|---|---|---|---|
| 3,107,077 | 10/1963 | Lassa | 248/478 |
| 4,077,597 | 3/1978 | Greig | 248/477 |
| 4,125,244 | 11/1978 | Lukey | 248/478 X |
| 4,218,036 | 8/1980 | Pitkanen | 248/478 |
| 4,623,115 | 11/1986 | Brester | 248/900 X |

FOREIGN PATENT DOCUMENTS

| | | | |
|---|---|---|---|
| 522288 | 3/1956 | Canada | 248/900 |
| 423815 | 2/1935 | United Kingdom | 248/900 |
| 848705 | 9/1960 | United Kingdom | 248/900 |

Primary Examiner—Karen J. Chotkowski
Attorney, Agent, or Firm—Michael J. Striker

[57] ABSTRACT

A support for an external ear view mirror for motor vehicles which comprises a support rod having an intermediate vertical portion for supporting the mirror and lower and upper transverse portions extending substantially horizontally from opposite ends of the intermediate vertical portion. Two supports are connected with free ends of the lower and upper transverse portions, respectively, for supporting said support rod on a vehicle body. A first support means includes a structure for rigidly connecting the free end of the lower transverse portion of the support rod with the one support, and an element for fixedly connecting the one support with the vehicle body. The second support includes a bracket for pivotally attaching the free end of the upper transverse portion with the second support and an arrangement for pivotally attaching the second support means to the vehicle body.

3 Claims, 2 Drawing Sheets

SUPPORT FOR AN EXTERNAL REARVIEW MIRROR FOR MOTOR VEHICLES

BACKGROUND OF THE INVENTION

The invention relates to a support for an external reaview mirror for heavy vehicles such as buses, trucks and the like.

Generally, supports for external rearview mirrors for motor vehicles are widely known and used. However, the known conventional support does not have a sufficient stability against wind and vibrations. Also, they do not have appropriate means that would permit their easy adjustment by a vehicle driver.

SUMMARY OF THE INVENTION

The object of the invention is a support for an extnal rearview mirror which is stable against wind and vibration and is easily adjustable.

The object of the invention is achieved by providing a support for an external rearview mirror for motor vehicles, which comprises a support rod having an intermediate vertical portion for supporting the mirror and lower and upper transverse portions exteding substantially horizontally from opposite ends of said intermediate vertical portion, and first and second support means connected with free ends of the lower and upper transverse portions, respectively, for supporting the support rod on a vehicle body. The first support means includes means for rigidly connecting the free end of the lower transverse portion of said support rod with the first support means, and means for fixedly connecting the first support means with the vehicle body. The second support means includes first means for pivotally attaching the free end of the upper transverse portion with the second support means and second means for pivotally attaching the second support means to the vehicle body. According to a further feature of the invention, the lower transverse portion of the support rod includes a cylindrical member having a lower end face and a pin projecting from the lower end face. The first support means includes a bush for receiving the pin and having nervures on an upper end face thereof. The lower end face of the cylindrical member is provided with nervures cooperating with the nervures on the upper end face of the bushing to provide for engagement between the lower end face of the cylindrical member with the upper end face of the bushing. The rigidly connecting means includes a guide washer arranged in the bushing and spaced from an upper transverse portion of the bushing and through which the pin extends. A helical spring extends between the upper transverse portion of the bushing and the guide washer to bias the respective end faces with nervures thereon against each other. The pin may be secured to the guide washer by a screw engaging an inner thread formed in the end thereof.

The fixedly connecting means of the first support means comprises a panel for attachment to the vehicle body.

The upper transverse portion of the support rod may have a flat end portion, and the first means include a base bracket having spaced parallel sides for pivotally receiving the flat end portion therebetween. The second support means further includes appropriate means for fixedly connecting the base bracket with the second means. This means preferably includes a substantially L-shaped rod having free ends of legs thereof provided with flat portions, and two cantilevers fixedly attachable to the vehicle body and having spaced parallel sides for receiving the flat portions of the free ends of the legs, respectively. The flat portions are pivotally secured with the cantilevers.

The present invention both as to its construction so to its method of operation, together with additional objects and advantages thereof, will be best understood from the following detailed description of a specific embodiment when read in connection with the accompanying drawings.

DETAILED DESCRIPTION OF THE PREFERRED EMBODIMENT

Figure 1:
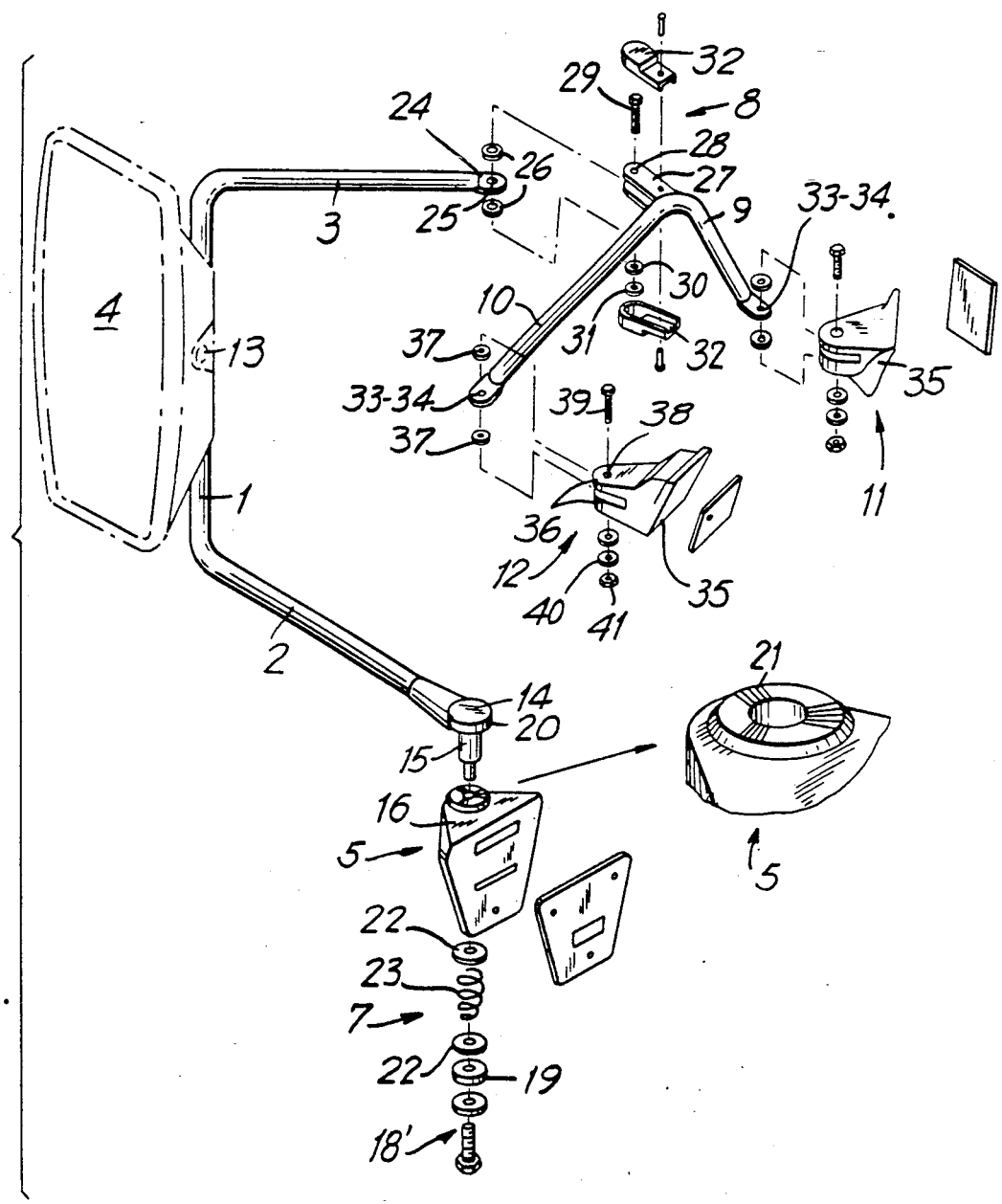
FIG. 1 shows an exploded view of an external rearview mirror support according to the invention.
Figure 2:
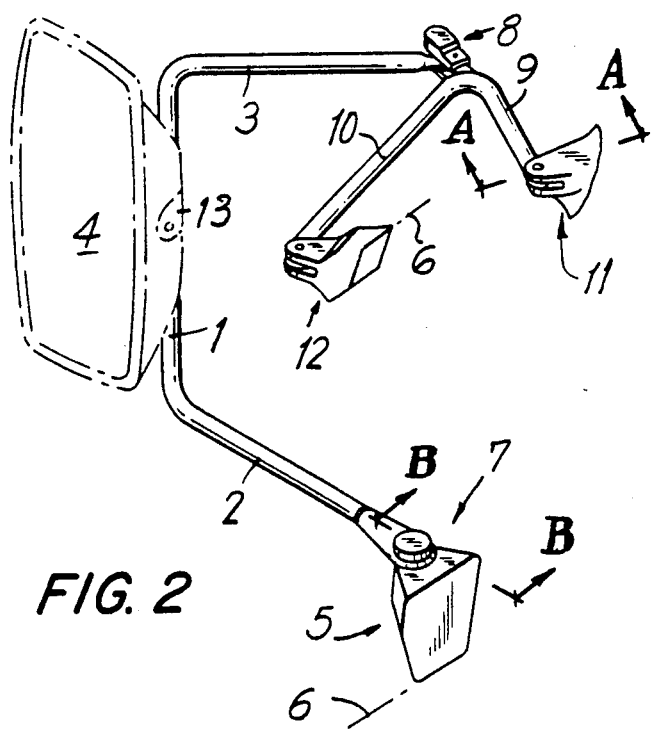
FIG. 2 shows a perspective view of an external rearview mirror support according to the invention in an assembled state.
Figure 3:
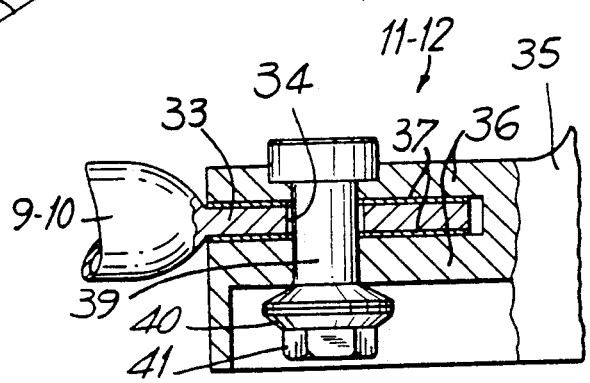
FIG. 3 shows a partial cross-sectional view of the support shown in FIG. 2, and taken along the line A—A.
Figure 4:
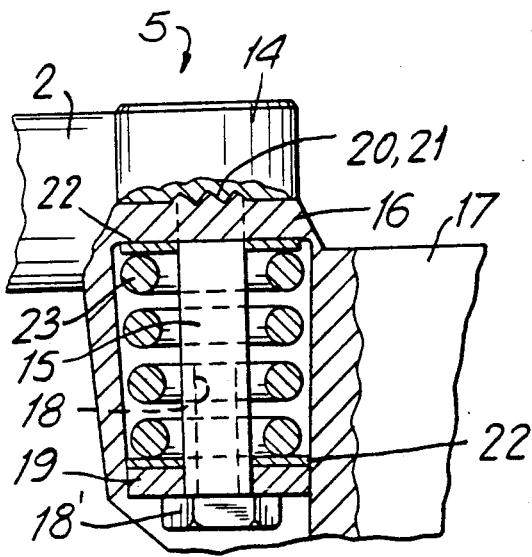
FIG. 4 shows a partial cross-sectional view of the support shown in FIG. 2 and taken along the line B—B.

A support for an external rearview mirror according to the invention and shown in the attached drawings comprises a tubular rod having a vertical portion 1 for supporting a mirror 4 and lower and upper transverse portions 2 and 3 extending substantially horizontally from opposite ends of the horizontal portion 1. A base 5 for attaching the support rod to a vehicle is connected to the lower transverse portion 2. The base 5 incorporates an adjusting and stabilizing mechanism 7. The free end of the upper transverse portion is connected with another base 8 including a substantially L-shaped rod having legs 9 and 10 free ends of which are pivotally received in respective seat members 11 and 12 to the vehicle frame.

The mirror 4 is supported on the rod verticcal portion 2 by a holder 13 adjustably secured on the vertical portion 2. The free end of the lower transverse portion 2 is provided with a cylindrical member 14 from which a pin 15 extends. The base 5 is provided with a bushing 16 for receiving the pin 15, and a panel 17 for attachment to the vehicle body. The pin 15 has a blind hole with an inner thread 18 for receiving a fixing screw assembly 18' that extends through a guide washer 19 supported inside the bushing 16. The cylindrical member 14 has a lower end face provided with nervures 20 that cooperate with nervures 21 on the upper end face of the bushing 16. A helical spring 23 extends along the pin 15 between spaced washers 22 supported on the guide washer 19 and inner face of an upper transverse portion of the bushing 16, respectively. The helical spring 23 provides for rigid engagement of nervures 20 and 21.

The free end of the upper transverse portion 3 of the support rod is provided with a flat end portion 24 having an orifice 25. The flat end portion 24 is received between bracket sides 27 of base 8 provided with respective openings 28. The flat end portion 24 is separated from sides 27 by respective nylon washers 26. A pivot screw 29 extends through openings 28 and 25 and washers 26. The screw 29 is secured to the bracket of the base 8 with a pressure washer 30 and a nut 31. The base 8 is also provided with protectors 32 fixed to sides 27 and soldered to L-shaped rod. The free ends of the two legs 9 and 10 of the L-shaped rod are provided with respective flat ends 33 having openings 34 for being pivotally attached to respective seat members 11 and 12.

Each seat member 11 and 12 is formed as a cantilever 35 with two parallel spaced sides 36 between which a respective flat end 33 is received. The flat end 33 is separated from sides 36 by respective washers 37. The sides 37 are provided with respective openings 38 through which as well as through opening 34, a pivot pin 39 extends. The pin 39 is secured to the cantilever 35 with a spring washer 40 and nut 41.

The above-described support provides for good stabilization of a support position while allowing for easy adjustment of the mirror position.

While the invention has been illustrated and described as embodied in an external rearview mirror support for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A support for an external rear view mirror for motor vehicles, comprising a support rod having an intermediate vertical portion for supporting the mirror and lower and upper transverse portions extending substantially horizontally from opposite ends of said intermediate vertical portion and having free ends; first and second base means connected with said free ends of said upper and lower transverse portions, respectively, for supporting said support rod on a vehicle body; means for pivotally connecting the free end of the upper transverse portions of said support rod with the first base means; means for rigidly connecting the free end of the lower transverse portion of said support rod with the second base means; first attachment means for pivotally attaching said first base means to the vehicle body; and second attachment means for fixedly attaching said second base means to the vehicle body; the free end of said upper transverse portion of said support rod having a flat end portion with an orifice therein, said first base means comprising a substantially L-shaped rod and a bracket fixedly secured to said substantially L-shaped rod and having spaced parallel sides for receiving said flat end portion therebetween, said parallel sides having openings therein corresponding to said orifice in said flat end portion, and said pivotally connecting means including a pin member extending through said openings in said parallel sides of said bracket and said orifice of said flat end portion; said L-shaped rod having long and short legs having free end portions, said first attachment means comprising two spaced cantilevers for pivotally receiving respective free end portions of said long and short legs of said L-shaped rod.

2. A support as set forth in claim 1, wherein said rigidly connecting means includes a cylindrical member secured at the free end of said lower transverse portion of said support rod and having a lower end face, nervures formed on said lower end face, and a pin projecting from said lower end face; said second base means including a bushing for receiving said pin and having an upper end face with nervures formed thereon and cooperating with said nervures on said lower end face of said cylindrical member to provide for engagement between said lower end face of said cylindrical member with said upper end face of said bushing, a guide washer arranged in said bushing and spaced from an upper transverse portion of said bushing and through which said pin extends, a helical spring extending between said upper transverse portion of said bushing and said guide washer, and thread means for securing said pin to said guide washer.

3. A support as set forth in claim 1, wherein said second attachment means comprises a panel for attachment to the vehicle body.

* * * * *